United States Patent
Iyatani et al.

(10) Patent No.: US 9,415,755 B2
(45) Date of Patent: Aug. 16, 2016

(54) VEHICLE BRAKE HYDRAULIC PRESSURE CONTROL APPARATUS

(71) Applicant: NISSIN KOGYO CO., LTD., Ueda, Nagano (JP)

(72) Inventors: Masatoshi Iyatani, Nagano (JP); Naoki Masuda, Nagano (JP)

(73) Assignee: AUTOLIV NISSIN BRAKE SYSTEMS JAPAN CO., LTD., Nagano (JP)

(*) Notice: Subject to any disclaimer, the term of this patent is extended or adjusted under 35 U.S.C. 154(b) by 51 days.

(21) Appl. No.: 14/224,671

(22) Filed: Mar. 25, 2014

(65) Prior Publication Data

US 2014/0292066 A1   Oct. 2, 2014

(30) Foreign Application Priority Data

Mar. 26, 2013  (JP) ................ 2013-064243

(51) Int. Cl.
| | |
|---|---|
| *B60T 11/228* | (2006.01) |
| *B60T 11/22* | (2006.01) |
| *B60T 8/40* | (2006.01) |
| *B60T 8/48* | (2006.01) |

(52) U.S. Cl.
CPC .............. *B60T 11/228* (2013.01); *B60T 8/4068* (2013.01); *B60T 11/22* (2013.01); *B60T 8/4872* (2013.01)

(58) Field of Classification Search
CPC ..... B60T 11/228; B60T 11/28; B60T 8/4068; B60T 11/22; B60T 8/4872; B60T 8/4291
USPC .......................................................... 303/87
See application file for complete search history.

(56) References Cited

U.S. PATENT DOCUMENTS

| 4,989,924 A | 2/1991 | Toda et al. |
|---|---|---|
| 5,149,178 A | 9/1992 | Saito et al. |
| 5,567,128 A | 10/1996 | Volz et al. |

(Continued)

FOREIGN PATENT DOCUMENTS

| DE | 3541742 A1 | 5/1987 |
|---|---|---|
| DE | 19506152 A1 | 8/1996 |

(Continued)

OTHER PUBLICATIONS

Japanese Office Action for related JP application No. 2013-064243, drafted Jan. 13, 2015, 6 pages.

(Continued)

*Primary Examiner* — Xuan Lan Nguyen
(74) *Attorney, Agent, or Firm* — Andrew M. Calderon; Roberts Mlotkowski Safran Cole & Calderon, P.C.

(57) ABSTRACT

A vehicle brake hydraulic control apparatus includes a reservoir, a hydraulic pressure pump, an orifice, a damper and a one-way valve. The reservoir absorbs an excess brake hydraulic pressure of a wheel brake. The hydraulic pressure pump suctions brake fluid absorbed by the reservoir and returns the suctioned brake fluid to a master cylinder through a return line. The orifice is provided in the return line. The damper is connected to the return line between the orifice and the hydraulic pressure pump and damps discharge pressure pulsation of the hydraulic pressure pump. The one-way valve is provided in the return line between the damper and the orifice and prevents a hydraulic flow from an orifice side to a damper side.

17 Claims, 3 Drawing Sheets

(56) References Cited

U.S. PATENT DOCUMENTS

| | | | |
|---|---|---|---|
| 2010/0319334 A1* | 12/2010 | Kley et al. .................. 60/325 |
| 2011/0115283 A1 | 5/2011 | Harada et al. |
| 2012/0025599 A1 | 2/2012 | Park |

FOREIGN PATENT DOCUMENTS

| | | | | |
|---|---|---|---|---|
| JP | S62131855 | | 6/1987 | |
| JP | H01254459 | | 10/1989 | |
| JP | H03125664 | | 12/1991 | |
| JP | 04008656 A | * | 1/1992 | ............ B60T 8/40 |
| JP | 05201320 A | * | 8/1993 | ............ B60T 8/42 |
| JP | H10100881 | | 4/1998 | |
| JP | 2011226299 | | 11/2011 | |

OTHER PUBLICATIONS

Extended European Search Report for Appl. 14161728.2 dated Jun. 2, 2015, 6 pages.

* cited by examiner

VEHICLE BRAKE HYDRAULIC PRESSURE CONTROL APPARATUS

CROSS REFERENCE TO RELATED APPLICATION

This application is based on and claims priority under 35 U.S.C. §119 to Japanese Patent Application No. 2013-64243 filed on Mar. 26, 2013, the entire contents of which are incorporated herein by reference.

BACKGROUND

1. Field

The invention relates to a vehicle brake hydraulic pressure control apparatus of a motor vehicle or the like.

2. Related Art

For example, JP 2011-220299 A describes a vehicle brake hydraulic pressure control apparatus.

SUMMARY

In the vehicle brake hydraulic pressure control apparatus described in JP 2011-220299 A, an orifice is provided in a return line that connects a discharge side of a hydraulic pressure pump and a master cylinder. However, a damper is connected to the return line between the orifice and the hydraulic pressure. Therefore, when the brakes are applied, a part of a hydraulic pressure output from the master cylinder is absorbed by the damper. This results in a reduction in the sensation of rigidity in operating a brake pedal, which is not preferable from the viewpoint of providing a good brake pedal operation feeling.

Exemplary embodiments of the invention has been made in view of these circumstances and provide a vehicle brake hydraulic pressure control apparatus that offers a good brake pedal operation feeling without a damper absorbing a hydraulic pressure output by a master cylinder when brakes are applied.

(1) According to one aspect of the invention, a vehicle brake hydraulic control apparatus includes a reservoir, a hydraulic pressure pump, an orifice, a damper and a one-way valve. The reservoir absorbs an excess brake hydraulic pressure of a wheel brake. The hydraulic pressure pump suctions brake fluid absorbed by the reservoir and returns the suctioned brake fluid to a master cylinder through a return line. The orifice is provided in the return line. The damper is connected to the return line between the orifice and the hydraulic pressure pump and damps discharge pressure pulsation of the hydraulic pressure pump. The one-way valve is provided in the return line between the damper and the orifice and prevents a hydraulic flow from an orifice side to a damper side.

(2) In the apparatus of (1) the damper may include a suction port and a discharge port. The suction port continues to a hydraulic pressure pump side of the return line. The discharge port continues to a master cylinder side of the return line. The one-way valve may be provided at the discharge port.

(3) In the apparatus of (2), the damper may include a damper cylinder, a damper piston, a damper spring, and a port member. The damper piston partitions an inside of the damper cylinder into a spring chamber and a pressure receiving chamber. The damper spring is housed in the spring chamber and elastically presses the damper piston toward a pressure receiving chamber side. The port member has an auxiliary pressure receiving chamber and the discharge port. The auxiliary pressure receiving chamber coaxially continues to the pressure receiving chamber. The discharge port has a smaller diameter than the auxiliary pressure receiving chamber and coaxially continues to the auxiliary pressure receiving chamber. The one-way valve may include a valve seat, a valve body, and a valve spring. The valve seat is formed in an outer end of the discharge port. The valve body opens and closes the discharge port in cooperation with the valve seat. The valve spring biases the valve body toward a valve close direction.

(4) In the apparatus according to claim 3, the one-way valve may further include a cap-shaped valve housing that is connected to the port member and that houses the valve body and the valve spring. The orifice may be formed to pass through the valve housing.

With the configuration of (1), when the master cylinder operates, the hydraulic pressure output from the master cylinder is supplied to the wheel brake and is also supplied to the return line. However the one-way valve is provided in the return line between the damper and the orifice to prevent the flow of the brake fluid from the orifice side to the pressure receiving chamber side. Thus, the one-way valve cuts off the return line and prevents the flow of the brake fluid from the orifice side to the pressure receiving chamber side. This can prevent the hydraulic pressure output from the master cylinder from being absorbed by the damper. Thus, the hydraulic pressure output from the master cylinder can be supplied to the wheel brake with good efficiency, which offers the driver a good sensation of rigidity in operating the brake pedal, that is, a good brake pedal operation feeling.

With the configuration of (2), the damper has the suction port and the discharge port. The suction port continues to the hydraulic pressure side of the return line. The discharge port continues to the master cylinder side of the return line. The one-way valve is provided at the discharge port. Thus, the damper is disposed adjacent to the one-way valve, to thereby make it possible to realize a reduction in size of the body of the modulator which houses the damper and the one-way valve.

With the configuration of (3), the damper includes the damper cylinder, the damper piston, the damper spring and the port member. The damper piston partitions the inside of the damper cylinder into the spring chamber and the pressure receiving chamber. The damper spring is housed in the spring chamber and elastically presses the damper piston toward the pressure receiving chamber side. The port member has the auxiliary pressure receiving chamber and the discharge port. The auxiliary pressure receiving chamber coaxially continues to the pressure receiving chamber. The discharge port has the smaller diameter than that of the auxiliary pressure receiving chamber and coaxially continues to the auxiliary pressure receiving chamber. The one-way valve includes the valve seat, the valve body and the valve spring. The valve seat is formed in the outer end of the discharge port. The valve body opens and closes the discharge port in cooperation with the valve seat. The valve spring biases the valve body towards the valve close direction. Thus, when the hydraulic pressure pump operates, the direction in which the damper piston slides and the direction in which the valve body opens and closes the discharge port are the same direction. This enables the brake fluid to flow rectilinearly and smoothly from the damper to the one-way valve, thereby making it possible to suppress generation of air bubbles in the brake fluid. Also, since the port member has the auxiliary pressure receiving chamber, the total capacity of the pressure receiving chamber and the auxiliary pressure receiving chamber is increased, thereby making it possible to enhance the damping function of the damper.

With the configuration of (4), the one-way valve further has the cap-shaped valve housing. The valve housing is connected to the port member and houses the valve body and the valve spring. The orifice is formed in the valve housing. Thus, the valve housing serves as a orifice member, which obviates the necessity of providing an exclusive orifice member, and this contributes to obtaining the simple and small structure.

DETAILED DESCRIPTION

Exemplary embodiments of the invention will be described based on the accompanying drawings.

Figure 1:
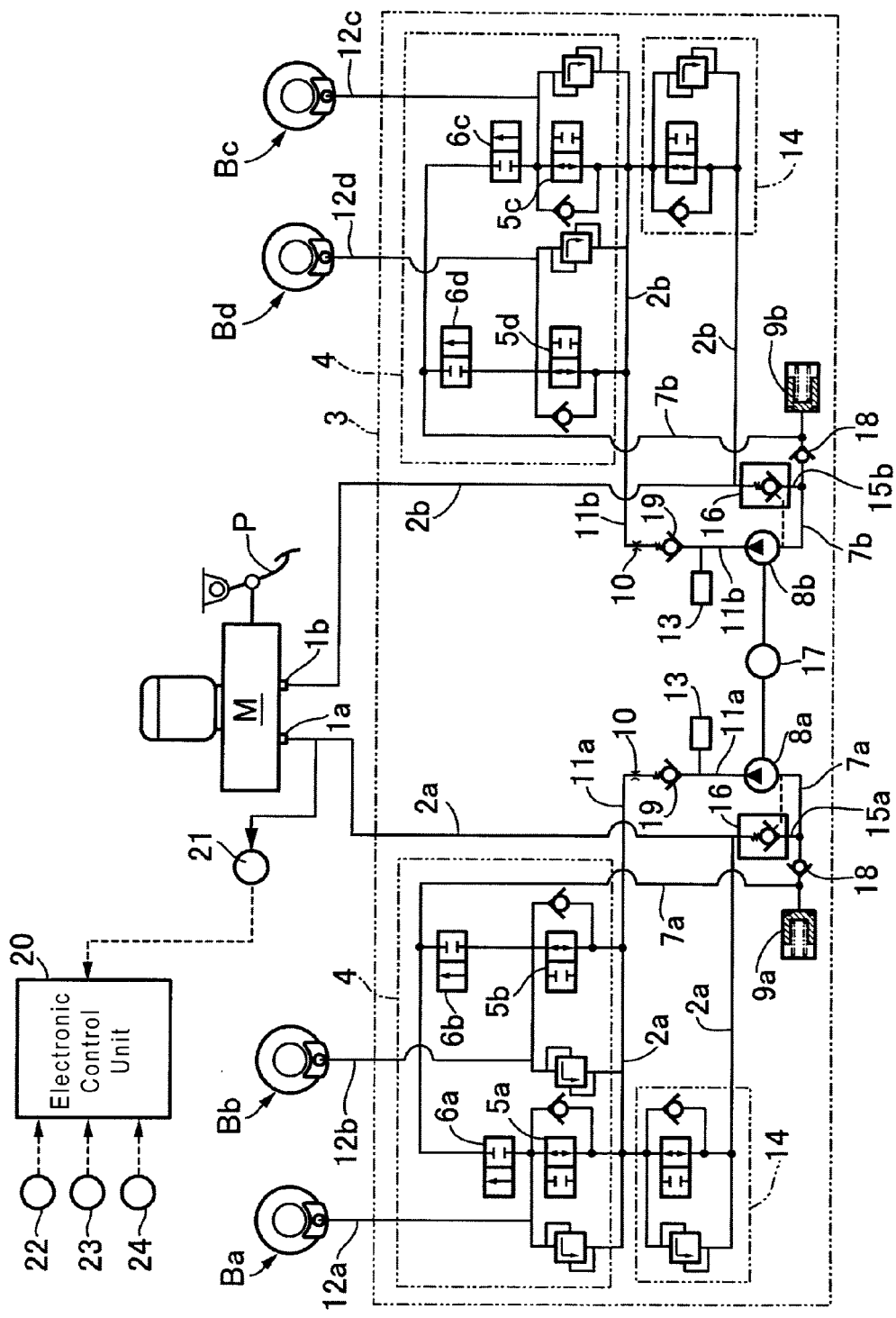
FIG. 1 is a hydraulic pressure circuit diagram of a vehicle brake system according to one exemplary embodiment of the invention.

Firstly, in FIG. 1, a master cylinder M is configured as a tandem-type master cylinder that includes a pair of first output port 1a and second output port 1b through which a brake hydraulic pressure is output according to an input applied to a piston from a brake pedal P. First and second input lines 2a, 2b are individually connected to the first and second output ports 1a, 1b. Also, first to fourth output lines 12a to 12d are connected individually to a left front wheel brake Ba, a right rear wheel brake Bb, a right front wheel brake Bc and a left rear wheel brake Bd. A modulator 3 is interposed between the first and second input lines 2a, 2b and the first to fourth output lines 12a to 12d.

The modulator 3 includes brake control valve modules 4. The brake control valve modules 4 include first to fourth inlet valves 5a to 5d and first to fourth outlet valves 6a to 6d. The first to fourth inlet valves 5a to 5d correspond individually to the left front wheel brake Ba, the right rear wheel brake Bb, the right front wheel brake Bc and the left rear wheel brake Bd, respectively. The first to fourth outlet valves 6a to 6d correspond individually to the respective wheel brakes Ba to Bd. The inlet valves 5a to 5d are normally open solenoid valves. Also, the outlet valves 6a to 6d are normally closed solenoid valves. The first inlet line 2a is connected to inlet ports of the first and second inlet valves 5a, 5b, and the second inlet line 2b is connected to inlet ports of the third and fourth inlet valves 5c, 5d.

The first output line 12a is connected to an outlet port of the first inlet valve 5a and an inlet port of the first outlet valve 6a. The second output line 12b is connected to an outlet port of the second inlet valve 5b and an inlet port of the second outlet valve 6b. The third output line 12c is connected to an outlet port of the third inlet valve 5c and an inlet port of the third outlet valve 6c. The fourth output line 12d is connected to an outlet port of the fourth inlet valve 5d and an inlet port of the fourth outlet valve 6d.

First and second hydraulic pressure pumps 8a, 8b are provided, and these first and second hydraulic pressure pumps 8a, 8b are driven by a common electric motor 17. Outlet ports of the first and second outlet valves 6a, 6b are connected to a suction port of the first hydraulic pressure pump 8a through a first pressure reducing line 7a. Outlet ports of the third and fourth outlet valves 6c, 6d are connected to a suction port of the second hydraulic pressure pump 8b through a second pressure reducing line 7b. First and second reservoirs 9a, 9b are connected to the first and second pressure reducing lines 7a, 7b, respectively.

A first suction line 15a that branches off the first input line 2a is connected to the first pressure reducing line 7a. A normally closed suction valve 16 is provided in the first suction line 15a. The suction valve 16 opens when the first hydraulic pressure pump 8a operates. Also, a one-way valve 18 is interposed in the first pressure reducing line 7a on an upstream side of a connection point between the first suction line 15a and the first pressure reducing line 7a.

Also, a second suction line 15b that branches off the second input line 2b is connected to the second pressure reducing line 7b. A normally closed suction valve 16 is also provided in the second suction line 15b. The suction valve 16 opens when the second hydraulic pressure pump 8b operates. Also, a one-way valve 18 is also interposed in the second pressure reducing line 7b on an upstream side of a connection point between the second suction line 15b and the second pressure reducing line 7b.

A discharge port of the first hydraulic pressure pump 8a is connected to the first input line 2a through a first return line 11a. A discharge port of the second hydraulic pressure pump 8b is connected to the second input line 2b through a second return line 11b. Also, an orifice 10 and a damper 13 are connected to each of the first and second return lines 11a, 11b that damp a discharge pressure pulsation of hydraulic pressures of the corresponding hydraulic pressure pumps 8a, 8b.

Normally open regulator valves 14, 14 are interposed individually in the first and second input lines 2a, 2b on an upstream side of connection points between the first and second input lines 2a, 2b and the corresponding first and second return lines 11a, 11b.

A hydraulic pressure sensor 21 (an example of a detector that detects an operating status of the master cylinder) is connected to either the first input line 2a or the second input line 2b. The hydraulic pressure sensor 21 detects an output hydraulic pressure of the master cylinder M and outputs a signal according to the output pressure so detected. Then, the signal output by the hydraulic pressure sensor 21 is input into an electronic control unit 20. In addition to the detection signal of the hydraulic pressure sensor 21, detection signals of a wheel speed sensors 22 which detects rotational speeds of the respective wheels, a steering angle sensor 23 which detects a steering angle of a steering wheel, a yaw rate sensor 24 which detects a yaw rate of the vehicle and the like are input to the electronic control unit 20. The electronic control unit 20 executes an arithmetic operation based on the detection signals so input and controls constituent parts of the brake control modules 4, 4.

Figure 2:
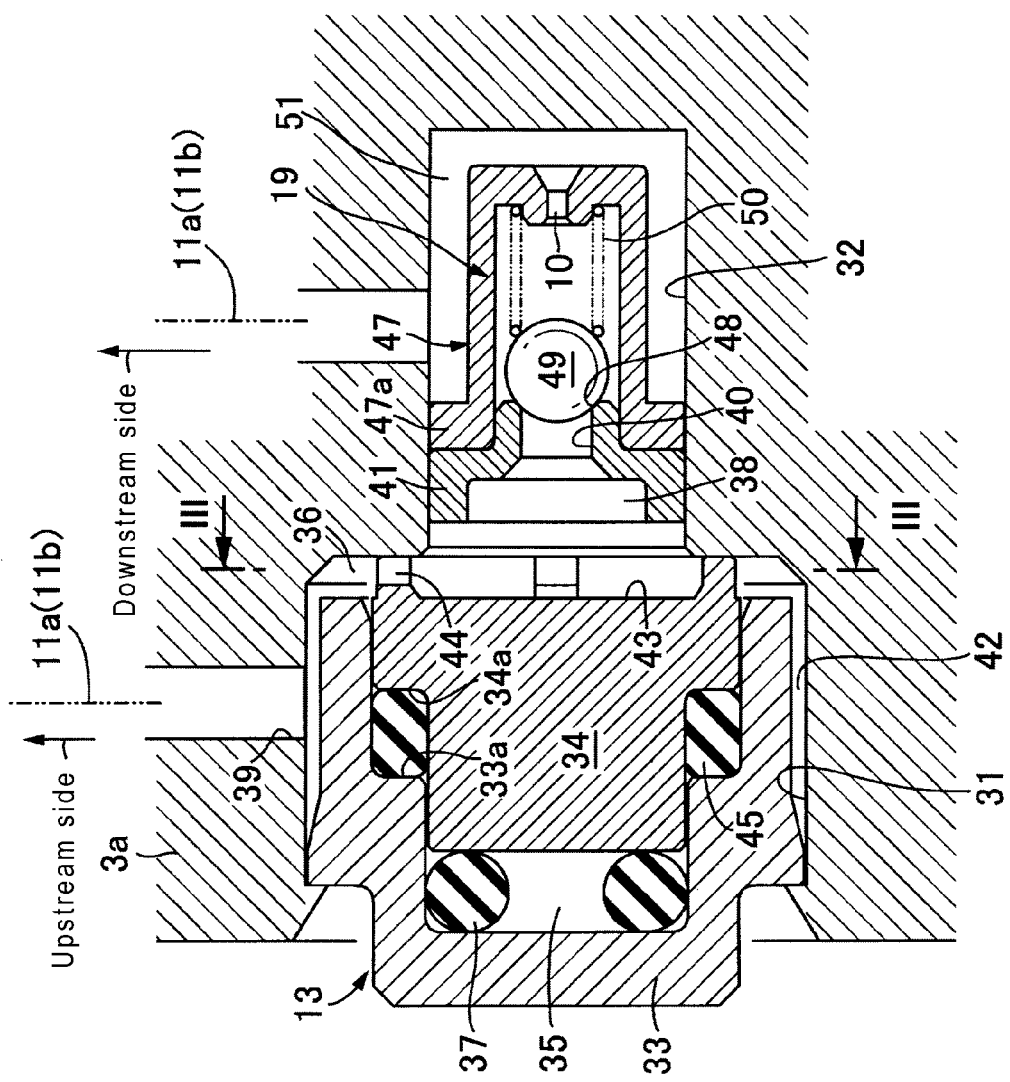
FIG. 2 is a specific configuration diagram around a damper in the hydraulic pressure circuit.
Figure 3:
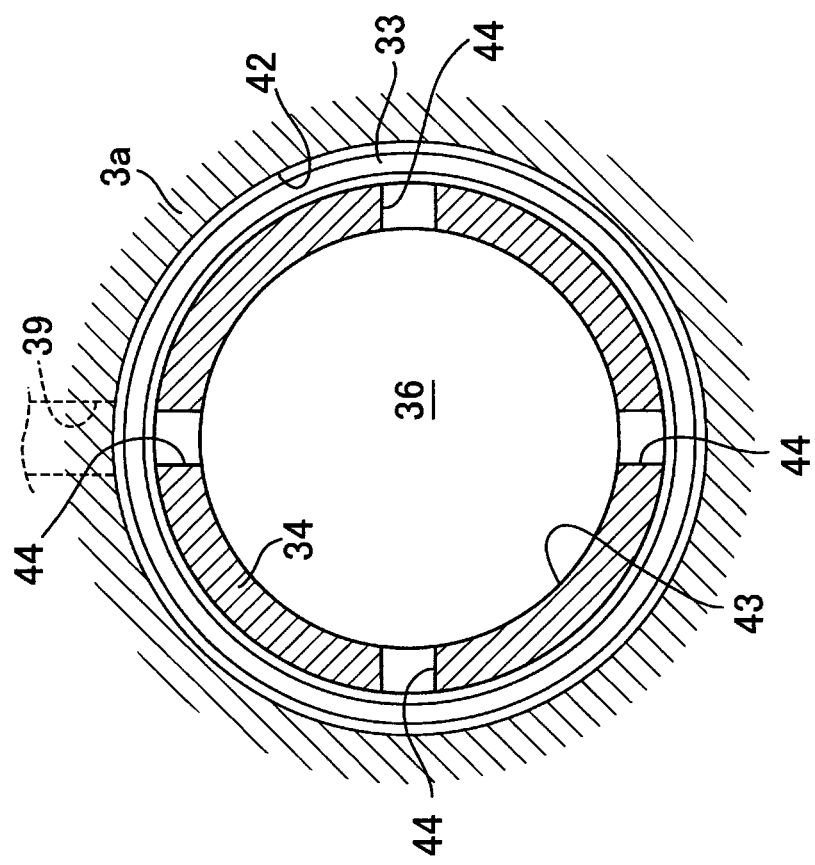
FIG. 3 is a section view taken along a line III-III in FIG. 2.

Next, referring to FIGS. 2 and 3, the orifice 10 and the damper 13 which are connected to each of the return lines 11a, 11b will be described specifically.

A damper mounting bore 31 and a one-way valve mounting bore 32 are provided coaxially in a body 3a of the modulator 3. The damper mounting bore 31 opens into one side surface of the body 3a. The one-way valve mounting bore 32 opens into an inner end of the damper mounting bore 31 and has a smaller diameter than that of the damper mounting bore 31. A suction port 39 is opened into one side of the damper mounting bore 31, and this suction port 39 continues to an upstream side (the hydraulic pressure pump 8a, 8b side) of each of the return lines 11a, 11b. Also, a downstream-side line (a line on the master cylinder M side) of the return line 11a, 11b opens into one side of the one-way valve mounting bore 32. Then, the damper 13 is mounted in the damper mounting bore 31. Also, the one-way valve 19 is mounted in the one-way valve mounting bore 32.

The damper 13 includes a damper cylinder 33, a damper piston 34, a damper spring 37 and a port member 41. The damper cylinder 33 is press fitted in the damper mounting bore 31 and is fixed therein. The damper piston 34 partitions an inside of the damper cylinder 33 into a spring chamber 35 and a pressure receiving chamber 36. The damper spring 37 is housed in the spring chamber 35 and elastically presses the damper piston 34 towards the pressure receiving chamber 36 side. The damper spring 37 is made of an elastic material such as rubber. The port member 41 has an auxiliary pressure receiving chamber 38 and a discharge port 40. The auxiliary pressure receiving chamber 38 coaxially continues to the pressure receiving chamber 36. The discharge port 40 has a smaller diameter than that of the auxiliary pressure receiving chamber 38 and coaxially continues to the auxiliary pressure receiving chamber 38. The port member 41 is press fitted in the one-way valve mounting bore 32 and is fixed therein.

The damper cylinder 33 and the damper piston 34 have annular step portions 33a, 34a which face each other. An O ring 45 is provided between the step portions 33a, 34a, and this O ring 45 is deformed so as not to interrupt sliding of the damper piston 34. An annular passage 42 is formed between the damper mounting bore 31 and the damper cylinder 33 to allow the suction port 39 to communicate with the pressure receiving chamber 36.

A forward position of the damper piston 34 which minimizes the capacity of the pressure receiving chamber 36 is restricted by bringing the damper piston 34 into abutment with an inner end surface of the damper mounting bore 31. A recess portion 43 and a plurality of grooves 44, 44 . . . are provided on an abutment surface of the damper piston 34 which is brought into abutment with the inner end surface of the damper mounting bore 31. The recess portion 43 and the plurality of grooves 44, 44 . . . allow the pressure receiving chamber 36 to communicate with the auxiliary pressure receiving chamber 38.

The one-way valve 19 is housed in a cap-shaped valve housing 47. The valve housing 47 has a flange 47a which is press fitted in the one-way valve mounting bore 32 together with the port member 41 and is fixed therein. A conical valve seat 48 is formed on an end surface of the discharge port 40 of the port member 41 which faces an inside of the valve housing 47. A spherical valve body 49 and a valve spring 50 are housed in the valve housing 47. The valve body 49 opens and closes the discharge port 40 in cooperation with the valve seat 48. The valve spring 50 biases the valve body 49 in a direction in which the valve body 49 closes the discharge port 40. The valve spring 50 is made of a coil spring. In this way, the one-way valve 19 is disposed adjacent to the damper 13 so that the direction in which the valve body 49 opens and closes the discharge port 40 becomes the same as the direction in which the damper piston 34 slides.

The orifice 10 is formed in an end wall of the valve housing 47 to pass therethrough, and this orifice 10 opens an interior of the valve housing 47 to an exterior of the valve housing 47. A cylindrical passage 51 is formed between the valve housing 47 and the one-way valve mounting bore 32. The cylindrical passage 51 allows the orifice 10 to communicate with a downstream side of the return line 11a, 11b. The upstream side and downstream side of the return line 11a, 11b communicate with each other through the annular passage 42, the pressure receiving chamber 36, the auxiliary pressure receiving chamber 38, the discharge port 40, the orifice 10 and the cylindrical passage 51. The valve body 49, which opens and closes the discharge port 40, permits a flow of the brake fluid from the pressure receiving chamber 36 side to the orifice 10 side and prevents a reverse flow of brake fluid.

Next, operations of this embodiment will be described.
[Normal Braking]

In normal braking in which there is no possibility that the wheels lock up, the inlet valves 5a to 5d are deenergized to be opened, and the outlet valves 6a to 6d are deenergized to be closed. As this occurs, when the driver depresses the brake pedal P to activate the master cylinder M, an output hydraulic pressure from the first output port 1a is supplied to the left front wheel brake Ba and the right rear wheel brake Bb through the first input line 2a, the regulator valve 14, the first and second inlet valves 5a, 5b and the first and second output lines 12a, 12b, whereby the wheel brakes Ba, Bb are activated to operate. Also, an output hydraulic pressure from the second output port 1b is supplied to the right front wheel brake Bc and the left rear wheel brake Bd through the second input line 2b, the regulator valve 14, the third and fourth inlet valves 5c, 5d and the third and fourth output lines 12c, 12d, whereby the wheel brakes Bc, Bd are activated to operate.

[Anti-Lock Braking Control]

When one or more wheels are about to lock up during the normal braking, the electronic control unit 20 operates to energize an inlet valve(s), corresponding to the wheel(s) which are about to lock up, of the first to fourth inlet valves 5a to 5d so that the corresponding inlet valve(s) are closed and operates to energize an outlet valve(s), corresponding to the wheel(s) which are about to lock up, of the first to fourth outlet valves 6a to 6d so that the corresponding outlet valve(s) are opened. Then, an excess brake hydraulic pressure of the wheel brake(s) corresponding to the wheel(s) which are about to lock up is absorbed by the first reservoir 9a or the second reservoir 9b through the corresponding opened valve(s) of the first to fourth outlet valves 6a to 6d and the pressure reducing line(s) 7a, 7b which correspond to the opened outlet valve(s). This reduces the hydraulic pressure of the wheel brake(s) corresponding to the wheel(s) which are about to lock up.

When the hydraulic pressure of the wheel brake(s) corresponding to the wheel(s) which are about to lock up is to be kept constant, the inlet valve(s), corresponding to the wheel(s) which are about lock up, of the first to fourth inlet valves 5a to 5d are energized to be closed, while the outlet valve(s), corresponding to the wheel(s) which are about lock up, of the first to fourth outlet valves 6a to 6d are deenergized to be closed. Also, when the hydraulic pressure of the wheel brake(s) corresponding to the wheel(s) which are about to lock up are to be increased, the inlet valve(s), corresponding to the wheel(s) which are about to lock up, of the first to fourth inlet valves 5a to 5d are deenergized to be opened, while the outlet valve(s), corresponding to the wheel(s) which are about to lock up, of the first to fourth outlet valves 6a to 6d are deenergized to be closed. By controlling the hydraulic pressure at the wheel brake(s) in the above described manner, the wheels are prevented from locking up, to thereby make it possible to apply the brakes with good efficiency.

During the above described anti-lock braking control, the electronic control unit 20 activates the electric motor 17 to drive the first and second hydraulic pressure pumps 8a, 8b. Then, the first and second hydraulic pressure pumps 8a, 8b suction the brake fluid absorbed by the first and second reservoirs 9a, 9b through the first and second pressure reducing lines 7a, 7b and discharge the suctioned brake fluid to the first and second return lines 11a, 11b. The brake fluid discharged to the respective return lines 11a, 11b flows into the pressure receiving chambers 36 and the auxiliary pressure receiving chambers 38 of the corresponding dampers 13. As this occurs, discharge pressure pulsations of the corresponding hydraulic pressure pumps 8a, 8b are damped by a variation in volumetric capacity of the pressure receiving chambers 36 which is caused by the reciprocating sliding of the damper pistons 34 which is caused, in turn, by the elastic deformation of the damper springs 37. Furthermore, the brake fluid which has flowed into the pressure receiving chambers 36 then flows from the auxiliary pressure receiving chambers 38 to the discharge ports 40, forces the valve bodies 49 of the one-way valves 19 to open and passes through the discharge ports 40. Following this, the brake fluid passes through the orifices 10. While the brake fluid flows in the above described manner, the discharge pressure pulsations of the hydraulic pressure pumps 8a, 8b are damped by gaps between the valve seats 48 and the valve bodies 49 as well as by the restriction resistance of the orifices 10. The brake fluid which has passed through the orifices 10 flows into the downstream side of the return lines 11a, 11b and returns to the first and second input lines 2a, 2b through the regulator valves 14, 14. An increase in depressing amount of the brake pedal P which would otherwise be caused by the suction of the brake fluid by the reservoirs 9a, 9b is suppressed by the return of the brake fluid in this way.

Incidentally, the brake hydraulic pressures which are output from the master cylinder M to the first and second input lines 2a, 2b when the master cylinder M operates pass through the corresponding regulator valves 14 in the manner described above and thereafter are supplied to the first and second output lines 12a, 12b and the third and fourth output lines 12c, 12d. As this occurs, the brake fluid pressures are also supplied to the first and second return lines 11a, 11b. However, the one-way valves 19 are provided between the dampers 13 and the orifices 10 in the return lines 11a, 11b to prevent the flow of the brake fluid from the orifices 10 to the pressure receiving chambers 36, as described above. Therefore, the one-way valves 19 cut off the corresponding return lines 11a, 11b to prevent the flow of the brake fluid from the orifices 10 to the pressure receiving chambers 36. This prevents the output hydraulic pressures from the master cylinder M from being absorbed by the dampers 13. This enables the output hydraulic pressures from the master cylinder M to be supplied to the wheel brakes Ba to Bd with good efficiency. Then, it is possible to make the driver feel a good sensation of rigidity in operating the brake pedal P, that is, a good brake pedal operation feeling.

Also, the dampers 13 include the suction ports 39, which continue to the hydraulic pressure pumps 8a, 8b sides of the return lines 11a, 11b, and the discharge ports 40, which continue to the master cylinder M sides of the return lines 11a, 11b. Additionally, the one-way valves 19 are provided at the discharge ports 40. Therefore, the dampers 13 are disposed adjacent to the one-way valves 19, to thereby make it possible to reduce the size of the body 3a of the modulator 3 which houses the dampers 13 and the one-way valves 19.

Also, the dampers 13 each includes the damper cylinder 33, the damper piston 34, the damper spring 37 and the port member 41. The damper piston 34 partitions the inside of the damper cylinder 33 into the spring chamber 35 and the pressure receiving chamber 36. The damper spring 37 is housed in the spring chamber 35 and elastically biases the damper piston 34 towards the pressure receiving chamber 36. The port member 41 has the auxiliary pressure receiving chamber 38 and the discharge port 40. The auxiliary pressure receiving chamber 38 coaxially continues to the pressure receiving chamber 36. The discharge port 40 has the smaller diameter than that of the auxiliary pressure receiving chamber 38 and coaxially continues to the auxiliary pressure receiving chamber 38. Additionally, the one-way valves 19 each includes the valve seat 48, the valve body 49 and the valve spring 50. The valve seat 48 is formed at the outer end of the discharge port 40. The valve body 49 opens and closes the discharge port 40 in cooperation with the valve seat 48. The valve spring 50 biases the valve body 49 in the direction in which the valve body 49 closes the discharge port 40. Therefore, when the hydraulic pressure pumps 8a, 8b each operates, the damper piston 34 slides in the same direction as the direction in which the valve body 49 of the one-way valve 19 opens and closes the corresponding discharge port 40. This enables the brake fluid to flow rectilinearly and smoothly from the damper 13 to the one-way valve 19, to thereby make it possible to suppress generation of air bubbles in the brake fluid. Also, since the port member 41 has the auxiliary pressure receiving chamber 38, the total volumetric capacity of the pressure receiving chamber 36 and the auxiliary pressure receiving chamber 38 is expanded, to thereby make it possible to enhance the damping function of the damper 13.

Also, the cap-shaped valve housing 47 is provided on each of the one-way valves 19. The valve housing 47 is connected to the port member 41 and houses the valve body 49 and the valve spring 50. The orifice 10 is formed in the valve housing 47 to pass therethrough. This allows the valve housing 47 to serve as an orifice member and hence obviates the necessity of providing an exclusive orifice member, which contributes to realize the simple and small structure.

[Automatic Braking Control 1 (Traction Control)]

For example, if the front wheels, which are drive wheels, are about to spin when the vehicle starts from a standstill, the electronic control unit 20 calculates a difference in rotation speed between the front wheels and the rear wheels based on signals transmitted from the wheel speed sensors 22 of the respective wheels. Then, if the rotational speed difference exceeds a predetermined threshold, the electronic control unit 20 determines that the front wheels are spinning, then energizes the regulator valve 14, the second inlet valve 5b and the fourth inlet valve 5d to be closed and activates the electric motor 17 to drive the first and second hydraulic pressure pumps 8a, 8b. The first and second hydraulic pressure pumps 8a, 8b suction the brake fluid in the master cylinder M from the first and second output ports 1a, 1b through the first and second suction lines 15a, 15b, respectively. Then, the first and second hydraulic pressure pumps 8a, 8b supply the brake fluid to the left and right front wheel brakes Ba, Bc through the first and second return lines 11a, 11b and the first and third inlet valves 5a, 5c, and the hydraulic pressures so supplied are adjusted by the regulator valves 14. This enables the left and right front wheel brakes Ba, Bc to operate properly, to thereby make it possible to efficiently prevent the front wheels from spinning.

[Automatic Braking Control 2 (Brake Assist)]

When depression of the brake pedal P activates the master cylinder M to operate, the hydraulic pressure sensor 21 detects a master cylinder output hydraulic pressure and outputs a signal according to the detection to the electronic control unit 20. Then, the electronic control unit 20 calculates a speed at which the hydraulic pressure output from the master cylinder M is increased, based on the signal. If the pressure increasing speed exceeds a predetermined threshold, the electronic control unit 20 determines that sudden braking is occurring, then activates the electric motor 17 to drive the first and second hydraulic pressure pumps 8a, 8b and energizes the regulator valves 14 to be closed. When the first and second hydraulic pressure pumps 8a, 8b operate, the suction valves 16, 16 open. This enables the first and second hydraulic pressure pumps 8a, 8b to suction the output hydraulic pressures from the master cylinder M which stay in the first and second input lines 2a, 2b through the first and second suction lines 15a, 15b, respectively. Then, the suctioned hydraulic pressures are increased and are forcibly transmitted from the return lines 11a, 11b to the wheel brakes Ba to Bd through the inlet valves 5a to 5d. This enables the wheel brakes Ba to Bd to operate strongly to deal with the sudden braking.

As this occurs, even though the output hydraulic pressures from the master cylinder M pass through the suction valves 16, 16, the one-way valves 18, 18 prevent the output hydraulic pressures from being absorbed by the first and second reservoirs 9a, 9b. This can suppress loss of the output hydraulic pressures from the master cylinder M.

[Automatic Braking Control 3 (Vehicle's Running Posture Control)]

For example, assuming that if output signals from the steering angle sensor 23 and the yaw rate sensor 24 do not correspond to each other while the vehicle is turning to the left and if the electronic control unit 20 determines based on the output signals that the vehicle is turning to the left excessively, the electronic control unit 20 activates the electric motor 17 to drive the first and second hydraulic pressure pumps 8a, 8b and energizes the regulator valves 14, the first inlet valve 5a and the fourth inlet valve 5d to be closed in order to correct the orientation of the vehicle. As a result, the first and second hydraulic pressure pumps 8a, 8b suction the working fluid in the master cylinder M from the first and second output parts 1a, 1b through the first suction line 15a and the second suction line 15b and supply the working fluid so suctioned only to the right front wheel brake Bc and the right rear wheel brake Bb through the return lines 11a, 11b and the second and third inlet valves 5b, 5c, and the hydraulic pressures so supplied are adjusted by the regulator valves 14. Thus, only the right front wheel brake Bc and the right rear wheel brake Bb operate properly, whereby the running posture of the vehicle is corrected towards the right so as to make the running posture of the vehicle correspond to the steered angle of the vehicle.

Also, in order to correct the orientation of the vehicle to the left, in contrast to the above described operation, the second inlet valve 5b and the third inlet valve 5c are energized to be closed, so that the discharge hydraulic pressures of the first and second hydraulic pressure pumps 8a, 8b are supplied only to the left front wheel brake Ba and the left rear wheel brake Bd through the first and fourth inlet valves 5a, 5d to activate the wheel brakes Ba, Bd to operate.

The invention is not limited to the embodiments described heretofore and may be modified in design variously without departing from the spirit and scope thereof. For example, the invention may also be applied to a rear-wheel drive vehicle. Also, the dampers 13, the one-way valves 19 and the orifices 10 may be disposed separately and independently. Furthermore, the invention may also be applied to a brake hydraulic pressure control apparatus which has only the anti-lock braking function without having the automatic braking functions (without including the regulator valves 14 and the suction valves 16).

What is claimed is:

1. A vehicle brake hydraulic control apparatus comprising:
    a reservoir that absorbs an excess brake hydraulic pressure of a wheel brake;
    a hydraulic pressure pump that suctions brake fluid absorbed by the reservoir and that returns the suctioned brake fluid to a master cylinder through a return line;
    an orifice provided in the return line;
    a damper that is connected to the return line between the orifice and the hydraulic pressure pump and that damps discharge pressure pulsation of the hydraulic pressure pump; and
    a one-way valve that is provided in the return line between the damper and the orifice and that prevents a hydraulic flow from an orifice side to a damper side, wherein
    the damper includes
        a suction port continuing to a hydraulic pump side of the return line, and
        a discharge port continuing to a master cylinder side of the return line, and the one-way valve is provided at the discharge port,
        a damper cylinder,
        a damper piston that partitions an inside of the damper cylinder into a spring chamber and a pressure receiving chamber,
        a damper spring that is housed in the spring chamber and that elastically presses the damper piston toward a pressure receiving chamber side, and
    a port member having
        an auxiliary pressure receiving chamber that coaxially continues to the pressure receiving chamber, and
        the discharge port that has a smaller diameter than the auxiliary pressure receiving chamber and that coaxially continues to the auxiliary pressure receiving chamber, and the one-way valve includes
        a valve seat formed in an outer end of the discharge port,
        a valve body that opens and closes the discharge port in cooperation with the valve seat, and
        a valve spring that biases the valve body toward a valve close direction.

2. The apparatus according to claim 1, wherein
    the one-way valve further includes a cap-shaped valve housing that is connected to the port member and that houses the valve body and the valve spring, and
    the orifice is formed to pass through the valve housing.

3. The apparatus according to claim 1, further comprising:
    outlet ports of first and second outlet valves connected to a suction port of the hydraulic pressure pump through a pressure reducing line;
    a suction line that branches off an input line connected to the pressure reducing line;
    a normally closed suction valve provided in the suction line; and
    a one-way valve interposed in the pressure reducing line on an upstream side of a connection point between the suction line and the pressure reducing line, wherein
    the reservoir is connected to the pressure reducing lines.

4. The apparatus according to claim 3, further comprising
    a discharge port of the hydraulic pressure pump connected to the input line through the return line.

5. The apparatus according to claim 1, wherein
    the damper comprises:
        a damper mounting bore and a one-way valve mounting bore provided coaxially in a body, wherein the damper mounting bore opens into one side surface of the body and the one-way valve mounting bore opens into an inner end of the damper mounting bore and has a smaller diameter than that of the damper mounting bore;

a suction port is opened into one side of the damper mounting bore and continues to an upstream side of the hydraulic pressure pump of the return line;

a downstream-side line on a master cylinder M side of the return line opens into one side of the one-way valve mounting bore;

the damper is mounted in the damper mounting bore; and the one-way valve is mounted in the one-way valve mounting bore.

6. The apparatus according to claim 5, wherein:

the damper cylinder is press fitted in the damper mounting bore and is fixed therein; and the port member is press fitted in the one-way valve mounting bore and fixed therein.

7. The apparatus according to claim 6, wherein the port member comprises the discharge port.

8. The apparatus according to claim 7, wherein the damper spring is rubber.

9. The apparatus according to claim 1, wherein the damper cylinder and the damper piston include annular step portions which face each other, and an O ring is provided between the step portions and is deformed so as not to interrupt sliding of the damper piston.

10. The apparatus according to claim 9, further comprising an annular passage formed between the damper mounting bore and the damper cylinder to allow the suction port to communicate with the pressure receiving chamber.

11. The apparatus according to claim 10, wherein a forward position of the damper piston which minimizes capacity of the pressure receiving chamber is restricted by bringing the damper piston into abutment with an inner end surface of the damper mounting bore.

12. The apparatus according to claim 11, wherein a recess portion and a plurality of grooves are provided on an abutment surface of the damper piston which is brought into abutment with an inner end surface of the damper mounting bore, and the recess portion and the plurality of grooves allow the pressure receiving chamber to communicate with the auxiliary pressure receiving chamber.

13. The apparatus according to claim 5, wherein the one-way valve is housed in a cap-shaped valve housing, the valve housing has a flange which is press fitted in the one-way valve mounting bore together with the port member and is fixed therein, the valve seat is a conical valve seat and is formed on an end surface of the discharge port of the port member which faces an inside of the valve housing, the valve body is a spherical valve body and the valve spring are housed in the valve housing, the valve body opens and closes the discharge port in cooperation with the valve seat, and the valve spring biases the valve body in a direction in which the valve body closes the discharge port.

14. The apparatus according to claim 13, wherein the orifice is formed in an end wall of the valve housing to pass therethrough, and the orifice opens an interior of the valve housing to an exterior of the valve housing.

15. The apparatus according to claim 14, wherein a cylindrical passage is formed between the valve housing and the one-way valve mounting bore, and the cylindrical passage allows the orifice to communicate with a downstream side of the return line.

16. The apparatus according to claim 15, wherein the upstream side and downstream side of the return line communicate with each other through an annular passage, the pressure receiving chamber, the auxiliary pressure receiving chamber, the discharge port, the orifice and the cylindrical passage.

17. The apparatus according to claim 16, wherein the valve body, which opens and closes the discharge port, permits a flow of brake fluid from the pressure receiving chamber side to the orifice side and prevents a reverse flow of brake fluid.

* * * * *